(12) United States Patent
Asano (10) Patent No.: US 10,208,522 B2
(45) Date of Patent: Feb. 19, 2019

(54) MACHINE TOOL

(71) Applicant: FANUC Corporation, Yamanashi (JP)

(72) Inventor: Keita Asano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/380,224

(22) Filed: Dec. 15, 2016

(65) Prior Publication Data

US 2017/0176969 A1   Jun. 22, 2017
US 2017/0371313 A9   Dec. 28, 2017

(30) Foreign Application Priority Data

Dec. 18, 2015   (JP) .................................. 2015-247269

(51) Int. Cl.
*E05F 15/41* (2015.01)
*B23Q 11/08* (2006.01)
(Continued)

(52) U.S. Cl.
CPC .......... *E05F 15/41* (2015.01); *B23Q 11/0891* (2013.01); *B23Q 17/007* (2013.01);
(Continued)

(58) Field of Classification Search
CPC .... G05B 19/4065; F16P 3/12; B23Q 11/0891; B23Q 11/0089; B23Q 1/012; E05F 15/40; E05F 15/41
See application file for complete search history.

(56) References Cited

U.S. PATENT DOCUMENTS 4,870,592 A * 9/1989 Lampi ................ G05B 19/4189
                                                    29/38.9
5,587,915 A   12/1996 Nagatomi
(Continued)

FOREIGN PATENT DOCUMENTS

EP   0604663 A1   7/1994
JP   H5-221595 A  8/1993
(Continued)

OTHER PUBLICATIONS

English translation of JP2007219991.*
(Continued)

*Primary Examiner* — Justin B Rephann
(74) *Attorney, Agent, or Firm* — Hauptman Ham, LLP (57) ABSTRACT

A machine tool according to the present invention is provided with a door opening/closing device including a movable door, a door opening/closing drive motor configured to drive the movable door, a power transferring mechanism configured to transfer power of the door opening/closing drive motor to the movable door. The machine tool includes a disturbance torque estimation unit configured to estimate a disturbance torque applied to the door opening/closing drive motor at an opening/closing operation of the movable door, a torque comparison unit configured to compare the disturbance torque estimated by the disturbance torque estimation unit to a predetermined first upper limit and a predetermined first lower limit, and a motor stop unit configured to stop the opening/closing operation of the movable door when the torque comparison unit determines that the disturbance torque is larger than the first upper limit or smaller than the first lower limit.

7 Claims, 5 Drawing Sheets

(51) Int. Cl.
  *E05F 15/40* (2015.01)
  *F16P 3/12* (2006.01)
  *G05B 19/18* (2006.01)
  *F16P 1/02* (2006.01)
  *B23Q 17/00* (2006.01)

(52) U.S. Cl.
  CPC ............. *E05F 15/40* (2015.01); *F16P 1/02* (2013.01); *F16P 3/12* (2013.01); *G05B 19/182* (2013.01); *B23Q 11/0825* (2013.01); *E05Y 2900/608* (2013.01); *G05B 2219/34013* (2013.01)

(56) References Cited

U.S. PATENT DOCUMENTS

| | | | |
|---|---|---|---|
| 5,773,949 A | 6/1998 | Nagatomi et al. | |
| 5,977,732 A * | 11/1999 | Matsumoto | H02H 7/0851 318/283 |
| 6,243,006 B1 * | 6/2001 | Rejc | E06B 9/82 160/1 |
| 7,373,754 B2 * | 5/2008 | Albiero | H01H 3/142 200/61.43 |
| 2001/0041651 A1 * | 11/2001 | Abe | B23Q 1/0009 483/3 |
| 2005/0210752 A1 * | 9/2005 | Schulte | E05F 1/046 49/360 |
| 2006/0191203 A1 * | 8/2006 | Ueda | G01L 1/16 49/27 |
| 2008/0052996 A1 * | 3/2008 | Sugiura | E05F 15/42 49/28 |
| 2009/0196702 A1 * | 8/2009 | Meidar | B23Q 11/0891 409/134 |
| 2014/0132086 A1 * | 5/2014 | Matsumoto | B23Q 11/0085 307/328 |
| 2014/0239867 A1 * | 8/2014 | Bessho | H02H 7/0851 318/466 |
| 2015/0159417 A1 * | 6/2015 | Strasser | E05B 41/00 49/324 |
| 2015/0308176 A1 * | 10/2015 | Oda | E05F 15/40 49/31 |
| 2015/0308177 A1 | 10/2015 | Oda | |
| 2015/0338841 A1 | 11/2015 | Fujimoto | |
| 2016/0024834 A1 * | 1/2016 | Nagao | E05F 15/652 49/404 |
| 2016/0339554 A1 * | 11/2016 | Angel | B23Q 5/06 |

FOREIGN PATENT DOCUMENTS

| | | |
|---|---|---|
| JP | H0682346 A | 3/1994 |
| JP | 0751991 A | 2/1995 |
| JP | H08174383 A | 7/1996 |
| JP | H9-290986 A | 11/1997 |
| JP | 11-70490 A | 3/1999 |
| JP | 2000-308942 A | 11/2000 |
| JP | 2000-345765 A | 12/2000 |
| JP | 2006-83526 A | 3/2006 |
| JP | 2006075916 A | 3/2006 |
| JP | 2007219991 A | 8/2007 |
| JP | 2009-30322 A | 2/2009 |
| JP | 2011-161531 A | 8/2011 |
| JP | 2015-209658 A | 11/2015 |

OTHER PUBLICATIONS

Office Action in JP Application No. 2015-247269, dated Nov. 28, 2017, 8 pp.

Notice of Allowance in JP Application No. 2015-247269, dated May 1, 2018, 6pp.

\* cited by examiner

MACHINE TOOL

RELATED APPLICATIONS

The present application claims priority to Japanese Patent Application Number 2015-247269, filed Dec. 16, 2015, the disclosure of which is hereby incorporated by reference herein in its entirety.

BACKGROUND OF THE INVENTION

1. Field of the Invention

The present invention relates to a machine tool, and particularly relates to a machine tool provided with a door opening/closing device that can achieve safety at low cost.

2. Description of the Related Art

In a machine tool, a machining area is covered by a fixed cover typically called a splash guard to protect an operator from scattered pieces coming from coolant used in fabrication, chips generated in fabrication, cutter and tooling used in fabrication, a workpiece or the like. A movable door is provided in part of the fixed cover so as to allow the operator to perform replacement of workpieces, and maintenance work such as cleaning of inside of the machine and routine inspection.

The movable door may be a manual door, which is opened and closed by the operator, or may be an automatic door using a servomotor or an air cylinder to achieve a shorter door opening/closing time and automation using a robot (refer to Japanese Patent Laid-open No. 2006-075916, for example).

The automatic door opening/closing has a potential risk that the operator or the robot may be caught in the door due to an unexpected accident such as a false operation by the operator, which may result in injury or damage. In order to prevent such a situation, a sensor (area sensor) configured to detect existence of a human or an object in the machine is typically used. However, such a sensor is likely to be expensive, causing a cost problem.

SUMMARY OF THE INVENTION

It is an object of the present invention to provide a machine tool provided with a door opening/closing device that can achieve safety at low cost.

A machine tool according to the present invention is provided with a door opening/closing device including a movable door, a door opening/closing drive motor configured to drive the movable door, and a power transferring mechanism configured to transfer power of the door opening/closing drive motor to the movable door. The machine tool includes a disturbance torque estimation unit configured to estimate a disturbance torque applied to the door opening/closing drive motor at an opening/closing operation of the movable door, a torque comparison unit configured to compare the disturbance torque estimated by the disturbance torque estimation unit to a predetermined first upper limit and a predetermined first lower limit, and a motor stop unit configured to stop the opening/closing operation of the movable door when the torque comparison unit determines that the disturbance torque is larger than the first upper limit or smaller than the first lower limit.

The machine tool according to the present invention may further include a commanding motor to move back certain amount unit configured to perform, after the door opening/closing operation is stopped by the motor stop unit, when the torque comparison unit determines the disturbance torque is larger than the predetermined first upper limit, an operation to move back the movable door by a predetermined distance in a direction opposite to an operation direction before the movable door is stopped.

In the machine tool according to the present invention, when a load is applied to the door at the move back operation of the movable door by the predetermined distance, commanding motor to move back certain amount unit may increase the speed of the moving back operation in accordance with the magnitude of the load.

A machine tool according to the present invention is provided with a door opening/closing device including a movable door, a door opening/closing drive motor configured to drive the movable door, and a power transferring mechanism configured to transfer power of the door opening/closing drive motor to the movable door. The machine tool includes a disturbance torque estimation unit configured to estimate a disturbance torque applied to the door opening/closing drive motor when the movable door is stopped, a torque comparison unit configured to compare the disturbance torque estimated by the disturbance torque estimation unit to a predetermined second upper limit, and a machine stop unit configured to stop operation of the machine tool when the torque comparison unit determines that the disturbance torque is larger than the second upper limit.

In the machine tool according to the present invention, a servomotor may be used as the door opening/closing drive motor.

The present invention can achieve a machine tool provided with a safe door opening/closing device by using any existing component without using an expensive component such as an area sensor.

BRIEF DESCRIPTION OF THE DRAWINGS

The above-described object and characteristics of the present invention, and any other object and characteristic thereof will be explained in the following description of embodiments with reference to the accompanying drawings. Among the drawings.

DETAILED DESCRIPTION OF THE PREFERRED EMBODIMENTS

Embodiments of the present invention will be described below with reference to the accompanying drawings.

In a machine tool provided with a door opening/closing device according to the present invention, at an opening/closing operation of a door, when the door collides with an object (obstacle) that disturbs the door opening/closing operation and a load is applied to the door, or when a motor rotates in an idling manner due to, for example, damage, abrasion on a component, or failed connection between components, determination is performed on a load (disturbance torque) on the door based on information (the rotational speed, the current, and the position, for example) of the motor so as to stop the door.

The machine tool provided with the door opening/closing device according to the present invention has determination-reference upper and lower limits that are set in advance for determination of whether the load applied to the door is abnormal. Then, when the disturbance torque during door opening/closing has a value larger than the upper limit or smaller than the lower limit, the load is determined to be abnormal and the door is stopped. When the disturbance torque becomes larger than the upper limit and the door is stopped, the door is moved back at low speed by a predetermined distance. When a load is applied to the door during the moving back operation, control is performed to increase the speed of the moving back operation in accordance with the magnitude of the load.

Figure 1:
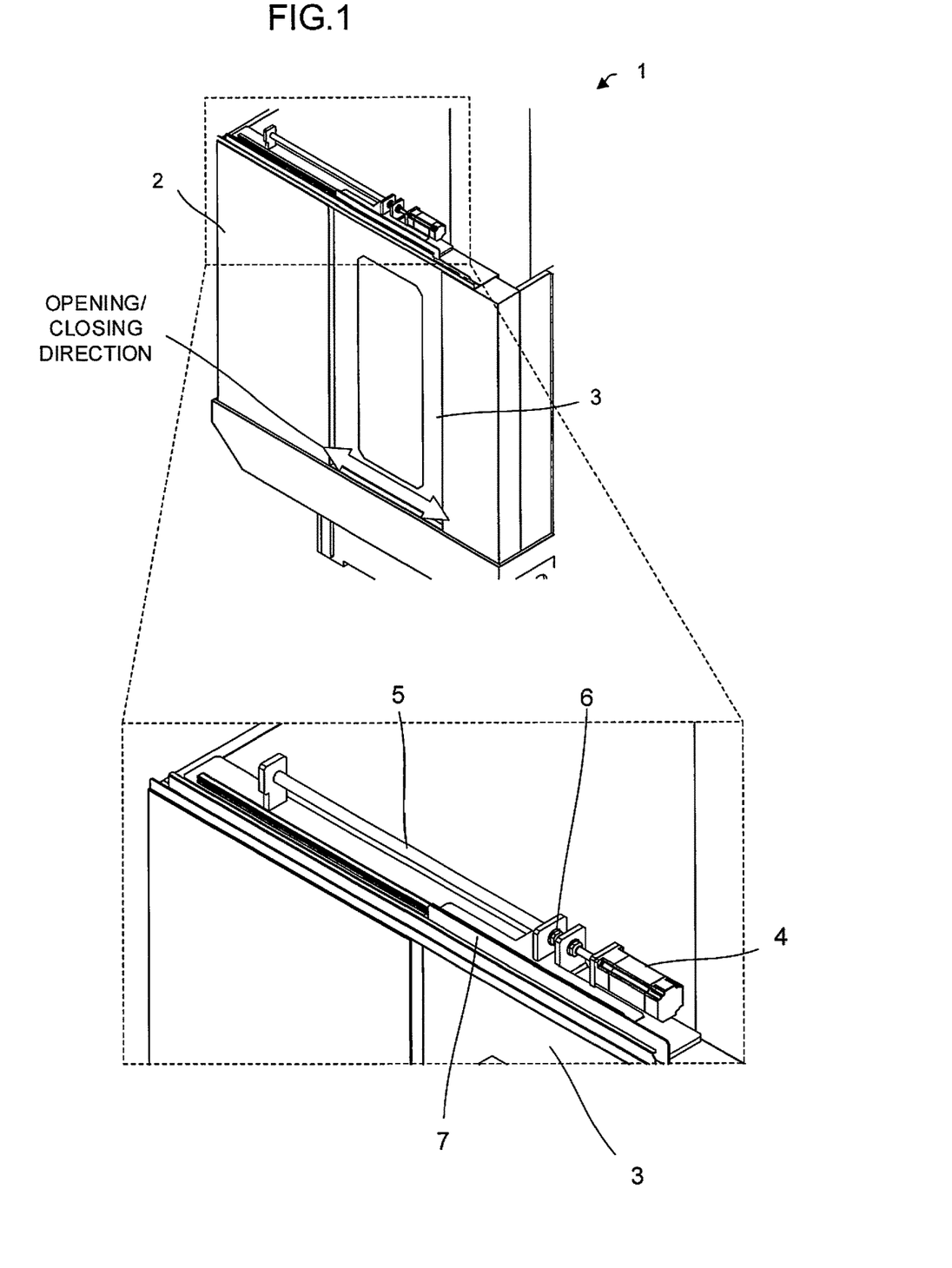
FIG. 1 is a schematic configuration diagram of a machine tool provided with a door opening/closing device according to an embodiment of the present invention.

FIG. 1 is a schematic configuration diagram of the vicinity of an automatic door provided to a fixed cover of a machine tool provided with a door opening/closing device according to a first embodiment of the present invention. The upper diagram in FIG. 1 is an entire diagram of the automatic door, and the lower diagram in FIG. 1 is an enlarged view of the frame illustrated with a dotted line in the upper diagram in FIG. 1. Typically, the automatic door provided to the fixed cover that covers the machine tool includes a power transferring mechanism, a member coupling the power transferring mechanism and the door, and the door, and performs door opening/closing using a motor as a drive source. The power transferring mechanism includes a ball screw, a rack and a pinion, a pulley, and a belt or a chain. In a machine tool 1 provided with a door opening/closing device illustrated in FIG. 1, a fixed cover 2 that covers a machining area is provided with a door 3. A servomotor 4, and a ball screw 5 as an electric mechanism that converts rotational motion of the servomotor 4 into linear motion of a nut 6 are attached to an upper part of the fixed cover 2. The nut 6 is fixed to a plate 7 as a coupling member provided to an upper part of the door 3. When the servomotor 4 rotates, the plate 7 moves together with the nut 6, and the door 3 coupled with the plate 7 moves in the direction of the white arrow illustrated in FIG. 1, so that the door 3 is opened and closed.

Figure 2:
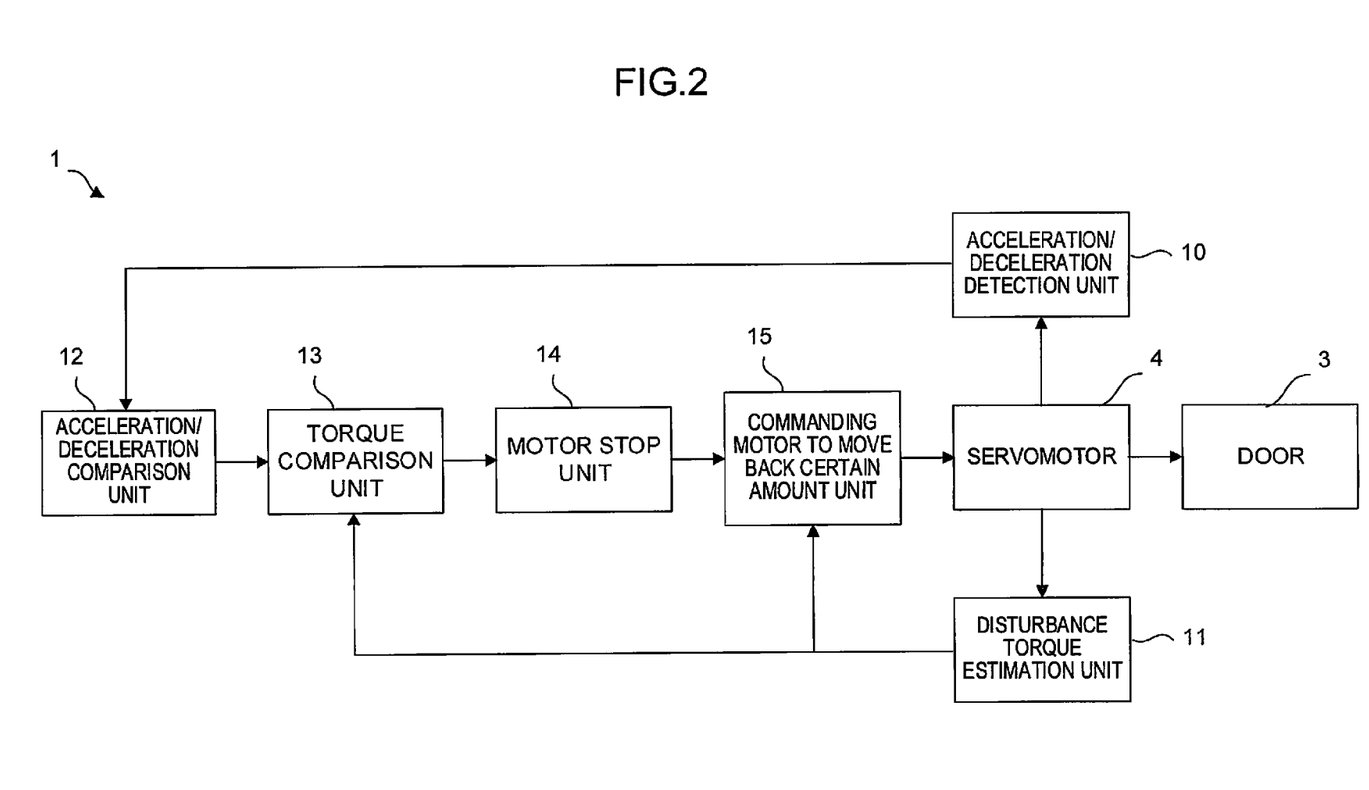
FIG. 2 is a functional block diagram of a machine tool provided with a door opening/closing device according to a first embodiment of the present invention.

FIG. 2 is a functional block diagram of a mechanism configured to perform control of the automatic door of the machine tool provided with the door opening/closing device according to an embodiment of the present invention. FIG. 2 omits illustration of a control unit configured to open and close the door 3 by outputting a move command to the servomotor 4.

An acceleration/deceleration detection unit 10 detects the speed and the acceleration/deceleration of the servomotor 4, and outputs the detected speed and acceleration/deceleration to an acceleration/deceleration comparison unit 12. The acceleration/deceleration detection unit 10 may detect the current speed and acceleration of the servomotor 4 from a servo control unit (not illustrated) configured to control the servomotor 4, or may detect the current speed and acceleration of the servomotor 4 based on an output from a position detector (not illustrated) included in the servomotor 4.

A disturbance torque estimation unit 11 estimates the magnitude of a load (external torque) applied to the servomotor 4, and outputs the estimated magnitude to a torque comparison unit 13. The estimation of the disturbance torque by the disturbance torque estimation unit 11 may be, for example, based on the actual rotational speed of the servomotor, and a torque command value (current value) from a control device to the servomotor, or based on a current value and a voltage value applied to the servomotor 4, by the well-known methods disclosed in, for example, Japanese Patent Laid-open No. 06-082346, Japanese Patent Laid-open No. 07-051991, Japanese Patent Laid-open No. 08-174383, and Japanese Patent Laid-open No. 2007-219991.

The acceleration/deceleration comparison unit 12 determines whether the servomotor 4 is moving based on the speed and acceleration of the servomotor 4 received from the acceleration/deceleration detection unit 10. If the servomotor 4 is moving, the acceleration/deceleration comparison unit 12 commands the torque comparison unit 13 to perform comparison and determination processing on the disturbance torque.

Having been commanded by the acceleration/deceleration comparison unit 12 to perform the comparison and determination processing on the disturbance torque, the torque comparison unit 13 compares the disturbance torque of the servomotor 4 received from the disturbance torque estimation unit 11 to the upper limit and the lower limit that are set in advance. Then, if the disturbance torque of the servomotor 4 is larger than the upper limit or smaller than the lower limit, the acceleration/deceleration comparison unit 12 outputs this comparison result to a motor stop unit 14.

when having received, from the torque comparison unit 13, the comparison result that the disturbance torque of the servomotor 4 is larger than the upper limit, the motor stop unit 14 generates a command to stop the servomotor 4, and commands a commanding motor to move back certain amount unit 15 to output, to the servomotor 4, the generated stop command, a command to move back the door 3 by a predetermined amount, and a command to increase the speed of the moving back operation in accordance with the magnitude of the load (external torque) applied to the servomotor 4, which is estimated by the disturbance torque estimation unit 11.

When having received, from the torque comparison unit 13, the comparison result that the disturbance torque of the servomotor 4 is smaller than the lower limit, the motor stop unit 14 generates a command to stop the servomotor 4 and commands the commanding motor to move back certain amount unit 15 to output the generated stop command to the servomotor 4.

The commanding motor to move back certain amount unit 15 outputs the stop command received from the motor stop unit 14 to the servomotor 4. When commanded by the motor stop unit 14 to move back the door 3 by the predetermined amount, the commanding motor to move back certain amount unit 15 outputs, to the servomotor 4, a command to move back the door 3 by the predetermined amount. In addition, when commanded by the motor stop unit 14 to increase the speed of the moving back operation in accordance with the magnitude of the load (external torque) applied to the servomotor 4, which is estimated by the disturbance torque estimation unit 11, the commanding motor to move back certain amount unit 15 outputs, to the servomotor 4, a command to increase the speed of the moving back operation in accordance with the magnitude of the load (external torque) applied to the servomotor 4.

Figure 3:
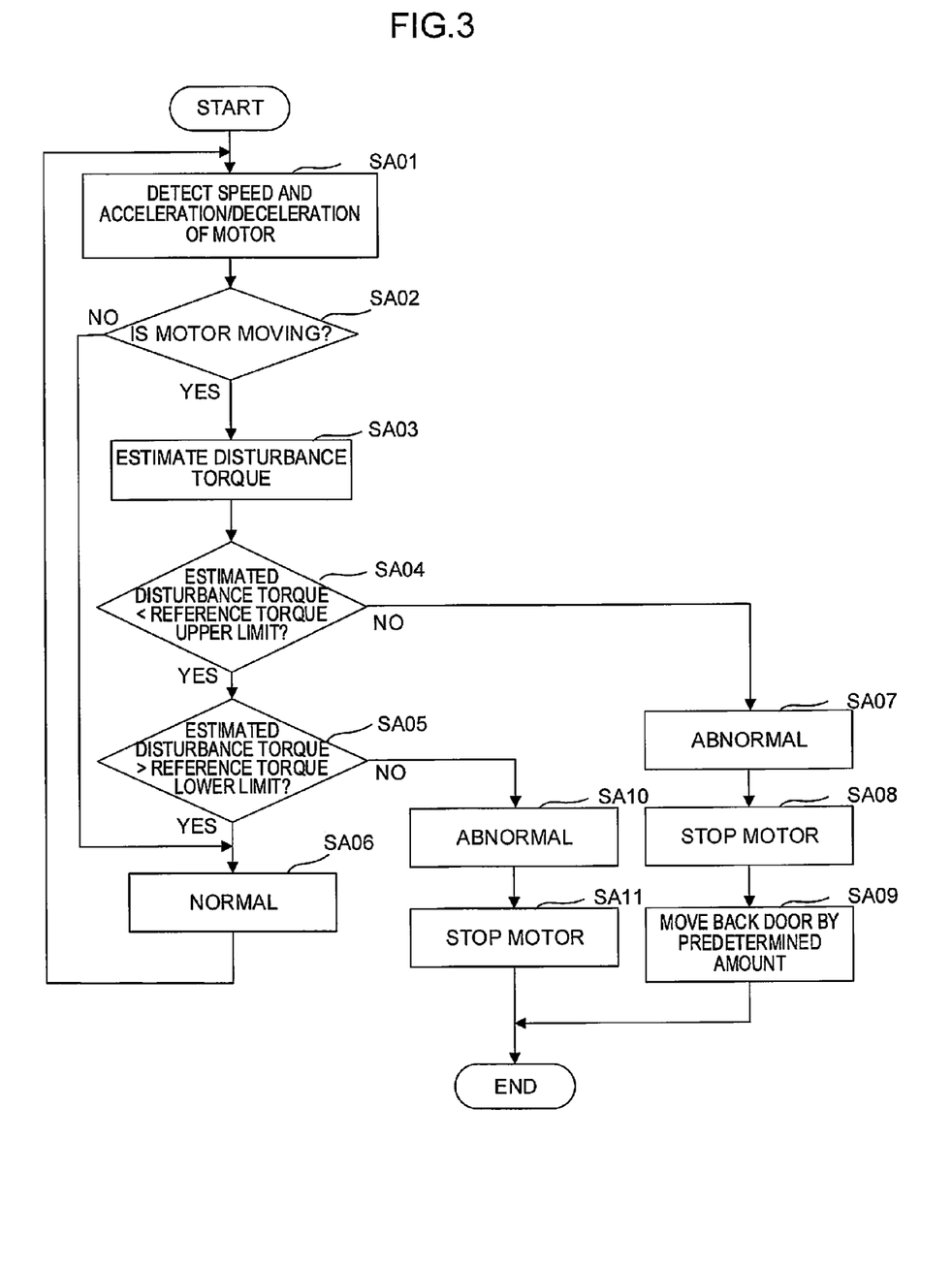
FIG. 3 is a flowchart of operation of the machine tool provided with the door opening/closing device according to the first embodiment of the present invention.

FIG. 3 is a flowchart of control processing of the automatic door of the machine tool provided with the door opening/closing device according to the present embodiment illustrated in FIG. 2.

[Step SA01] The acceleration/deceleration detection unit 10 detects the speed and acceleration/deceleration of the servomotor 4.

[Step SA02] The acceleration/deceleration comparison unit 12 determines whether the servomotor 4 is moving based on the speed and acceleration of the servomotor 4 detected at step SA01. The process proceeds to step SA03 if the servomotor 4 is moving, or proceeds to step SA06 if the servomotor 4 is not moving.

[Step SA03] The disturbance torque estimation unit 11 estimates the disturbance torque of the servomotor 4.

[Step SA04] The torque comparison unit 13 determines whether the disturbance torque of the servomotor 4 estimated at step SA03 is larger than a predetermined reference torque upper limit. The process proceeds to step'SA05 if the disturbance torque is not larger, or proceeds to step SA07 if the disturbance torque is larger.

[Step SA05] The torque comparison unit 13 determines whether the disturbance torque of the servomotor 4 estimated at step SA03 is smaller than the predetermined reference torque lower limit. The process proceeds to step SA06 if the disturbance torque is not smaller, or proceeds to step SA10 if the disturbance torque is smaller.

[Step SA06] It is determined that the door is in a normal opening/closing state, opening/closing control of the door is continued and the process proceeds to step SA01.

[Step SA07] It is determined that the door is in an abnormal opening/closing state.

[Step SA08] The motor stop unit 14 generates and outputs a command to stop the servomotor 4.

[Step SA09] After the stop command output to the servomotor 4 at step SA08, the commanding motor to move back certain amount unit 15 outputs a command to move back the door 3 by a predetermined amount, and a command to increase the speed of the moving back operation in accordance with the magnitude of the load (external torque) applied to the servomotor 4.

[Step SA10] It is determined that the door is in an abnormal opening/closing state.

[Step SA11] The motor stop unit 14 generates and outputs a command to stop the servomotor 4.

The machine tool 1 provided with a door opening/closing mechanism according to the present embodiment having the above-described configuration can be achieved as a machine tool provided with a safe door opening/closing device by using any existing component without using an expensive component such as an area sensor. The conventional area sensor used to detect abnormity at door opening/closing cannot detect abnormity such as scattering of a workpiece or a cutting tool occurring inside of the machine tool. The present disclosure can, however, achieve improved safety of the machine tool by determining the load (disturbance torque) applied to the door based on information (the rotational speed, the current, and the position, for example) of the servomotor, and stopping a machine operation.

Only setting the upper limit of the disturbance torque is sufficient to detect any caught obstacle in usual cases.

However, simultaneously setting the lower limit allows detection of fall of any component of the door opening/closing mechanism (fall of the door from a drive mechanism, for example). This is effective in avoiding component damage due to fall of a component, and in achieving safety of a human or a robot by accurately detecting the opening/closing state of the door.

Stopping at the upper limit of an abnormal load indicates possibility that a human or a robot is caught by the door, and thus, an operation to increase the speed of the moving back operation is performed in accordance with the magnitude of the load when any load is applied to the door while the door is being moved back at low speed by a predetermined distance, thereby additionally performing an avoidance operation to allow the human or the robot to escape from the catch in the door as quickly as possible.

In addition, the above-described abnormal load determination performed except at acceleration/deceleration of the door enables avoidance of false detection of an abnormal load due to, for example, backlash that is likely to occur right before the motor stops, right after the motor is actuated, or at low-speed drive.

In the machine tool provided with the door opening/closing device according to the present invention, when a load is applied to the door except at the door opening/closing operation, the load (disturbance torque) can be determined based on information (the rotational speed, the current, and the position, for example) of the servomotor so as to stop the machine.

Figure 4:
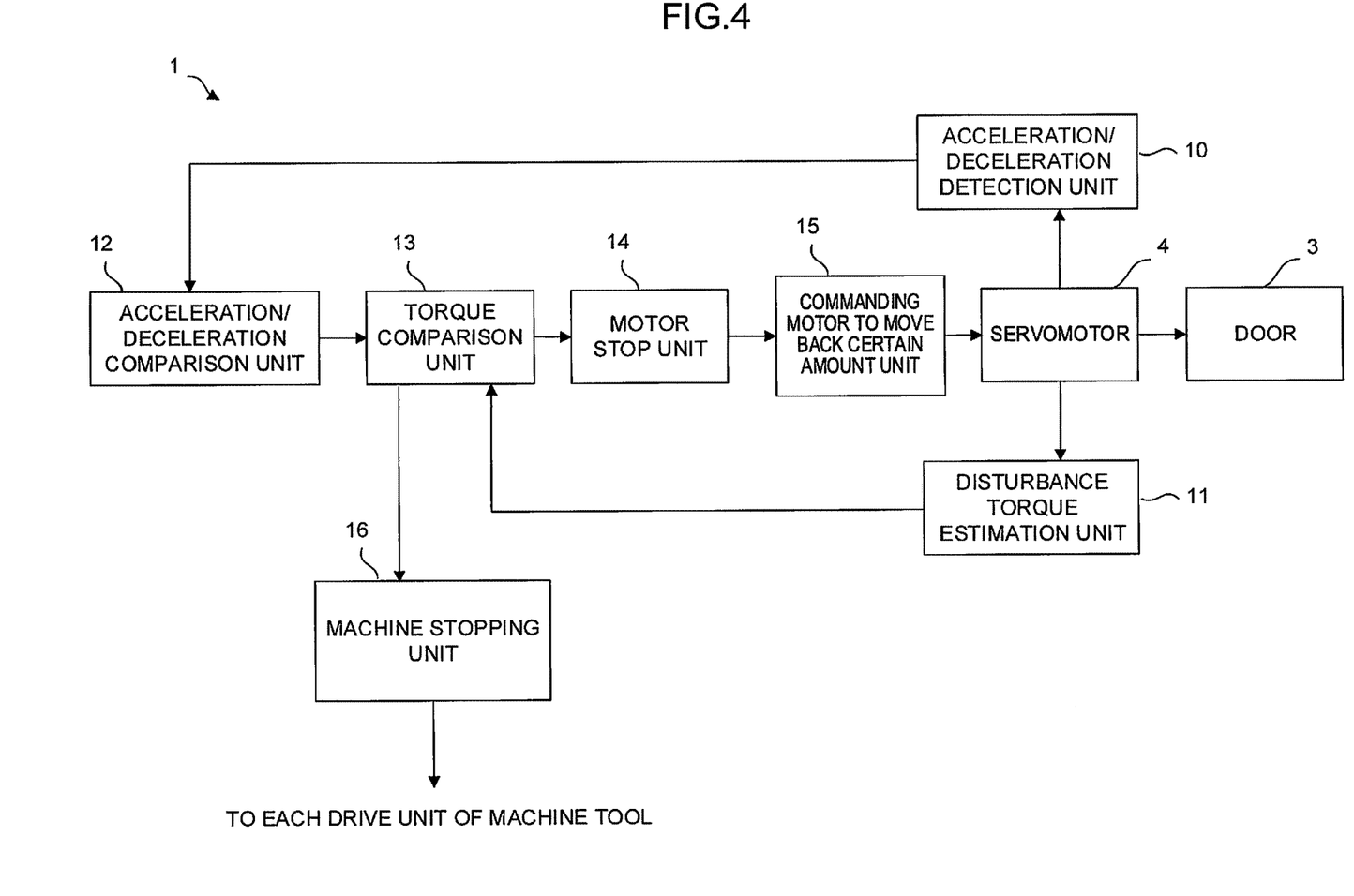
FIG. 4 is a functional block diagram of a machine tool provided with a door opening/closing device according to a second embodiment of the present invention.

FIG. 4 is a functional block diagram of a mechanism that performs control of an automatic door of a machine tool provided with a door opening/closing device according to a second embodiment of the present invention. FIG. 4 omits illustration of a control unit configured to open and close of the door 3 by outputting a move command to the servomotor 4. In FIG. 4, the door 3, the servomotor 4, and the functional units of the acceleration/deceleration detection unit 10, the disturbance torque estimation unit 11, the motor stop unit 14, the commanding motor to move back certain amount unit 15 are same as those in the first embodiment described above.

The acceleration/deceleration comparison unit 12 determines whether the servomotor 4 is moving based on the speed and acceleration of the servomotor 4 received from the acceleration/deceleration detection unit 10. If the servomotor 4 is moving, the acceleration/deceleration comparison unit 12 commands the torque comparison unit 13 to perform the comparison and determination processing on a disturbance torque applied when the opening/closing operation of the door 3 is stopped.

The acceleration/deceleration comparison unit 12 also determines whether the servomotor 4 is stopping based on the speed and acceleration of the servomotor 4 received from the acceleration/deceleration detection unit 10. If the servomotor 4 is stopping, the acceleration/deceleration comparison unit 12 commands the torque comparison unit 13 to perform the comparison and determination processing on a disturbance torque applied when the machine tool 1 is stopped.

When commanded by the acceleration/deceleration comparison unit 12 to perform the comparison and determination processing on the disturbance torque applied when the opening/closing operation of the door 3 is stopped, the torque comparison unit 13 compares the disturbance torque of the servomotor 4 received from the disturbance torque estimation unit 11 to a first upper limit and a first lower limit that are set in advance. Then, if the disturbance torque of the servomotor 4 is larger than the first upper limit or smaller than the first lower limit, the torque comparison unit 13 outputs this comparison result to the motor stop unit 14.

When commanded by the acceleration/deceleration comparison unit 12 to perform the comparison and determination processing on the disturbance torque applied when the machine tool 1 is stopped, the torque comparison unit 13 compares the disturbance torque of the servomotor 4 received from the disturbance torque estimation unit 11 to a second upper limit that is set in advance. Then, if the disturbance torque of the servomotor 4 is larger than the second upper limit, the torque comparison unit 13 outputs this comparison result to a machine stopping unit 16.

When having received, from the torque comparison unit 13, the comparison result that the disturbance torque of the servomotor 4 is larger than the second upper limit, the machine stopping unit 16 generates a stop command to a drive unit such as servomotor (not illustrated) configured to control each component of the machine tool, and outputs the generated stop command to each drive unit.

Figure 5:
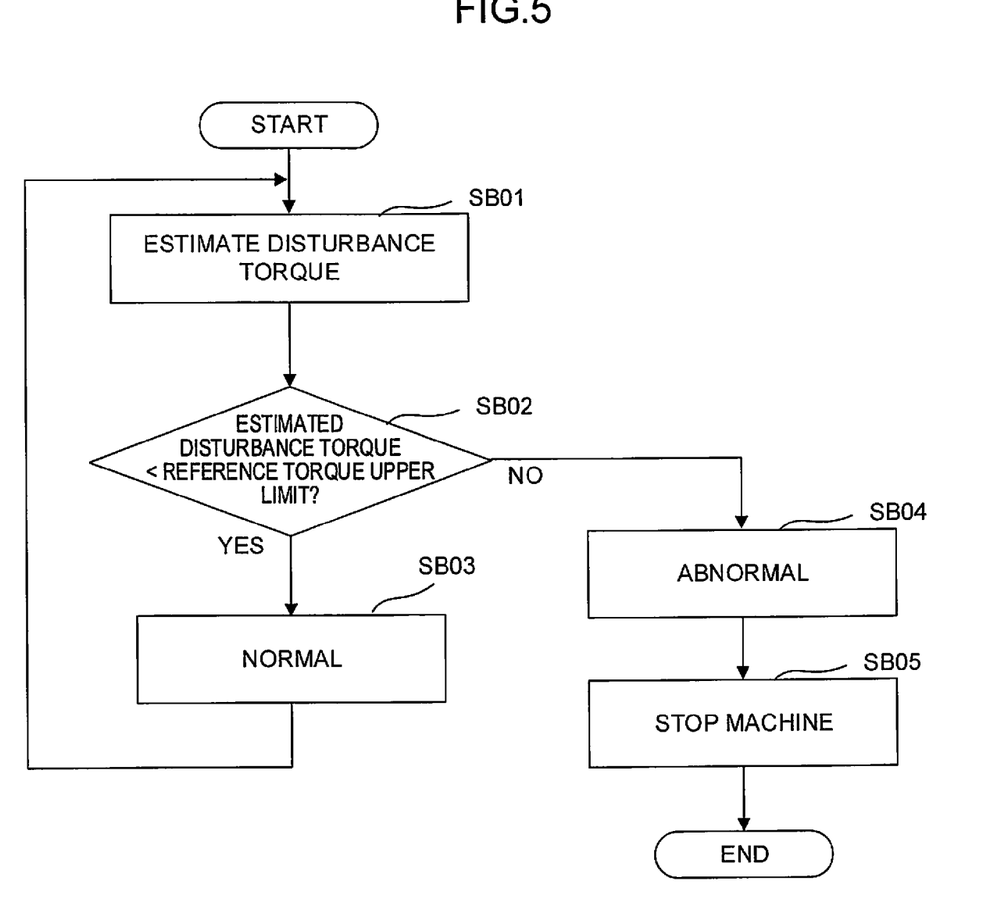
FIG. 5 is a flowchart of operation of the machine tool provided with the door opening/closing device according to the second embodiment of the present invention.

FIG. 5 is a flowchart of control processing of machine stopping in the machine tool provided with the door opening/closing device according to the present embodiment illustrated in FIG. 4.

[Step SB01] The disturbance torque estimation unit 11 estimates the disturbance torque of the servomotor 4.

[Step SB02] The torque comparison unit 13 determines whether the disturbance torque of the servomotor 4 estimated at step SB01 is larger than the predetermined reference torque second upper limit. The process proceeds to step SB03 if the disturbance torque is not larger, or proceeds to step SB04 if the disturbance torque is larger.

[Step SB03] It is determined that the machine tool 1 is in a normal operation state, and the operation of the machine tool 1 is continued as the process proceeds to step SB01.

[Step SB04] It is determined that the machine tool 1 is in an abnormal operation state.

[Step SA05] The machine stopping unit 16 generates and outputs a command to stop each drive unit of the machine tool 1.

According to the above-described configuration, when the disturbance torque is larger than the second upper limit except at the door opening/closing operation, the operation of the machine tool 1 can be stopped. This configuration allows detection of an accident of scattering of a fabricated part a cutting tool or the like, when the door 3 is closed during fabrication, for example. When a scattered object hits a component such as the door 3, impact of the hit is transferred to the servomotor 4, so that the disturbance torque applied to the servomotor 4 can be detected. When the door 3 is open during, for example, replacement of work pieces, the above configuration allows detection of an accident of collision of a robot performing the replacement of work pieces with the machine tool 1 by mistake. Similarly, when impact of the collision of the robot with each component of the machine tool 1 is transferred to the servomotor 4, the disturbance torque applied to the servomotor 4 can be detected.

The above describes the exemplary embodiments of the present invention, but the present invention is not limited thereto. The embodiments may be modified as appropriate to be achieved in various configuration.

For example, in the embodiments described above, the machine tool 1 provided with the door opening/closing device according to the second embodiment includes any function of the machine tool 1 provided with the door opening/closing device according to the first embodiment. However, the function of performing stopping by detecting any abnormality of the machine tool 1 described in the second embodiment may be implemented singularly.

The above describes the exemplary embodiments of the present invention, but the present invention is not limited thereto. The embodiments may be modified as appropriate to be achieved in other configurations.

The invention claimed is:

1. A machine tool, comprising:
a movable door;
a drive motor configured to drive the movable door;
a power transferring mechanism configured to transfer power of the drive motor to the movable door;
a disturbance torque estimation unit configured to estimate a disturbance torque applied to the drive motor in an opening or closing operation of the movable door;
a torque comparison unit configured to compare the disturbance torque estimated by the disturbance torque estimation unit to a predetermined upper limit and a predetermined lower limit; and
a motor stop unit configured to stop the opening or closing operation of the movable door when the torque comparison unit determines that the disturbance torque is smaller than the lower limit.

2. The machine tool according to claim 1, wherein
the motor stop unit is further configured to stop the opening or closing operation of the movable door when the torque comparison unit determines that the disturbance torque is larger than the upper limit,
the machine tool further comprising a move back unit configured to,
after the door opening or closing operation is stopped by the motor stop unit when the torque comparison unit determines that the disturbance torque is larger than the upper limit,
perform a moving back operation to move back the movable door by a predetermined distance in a direction opposite to an operation direction before the movable door is stopped.

3. The machine tool according to claim 2, wherein
when a load is applied to the door in the moving back operation of the movable door, the move back unit is configured to increase the speed of the moving back operation in accordance with the magnitude of the load.

4. The machine tool according to claim 1, wherein the drive motor is a servomotor.

5. The machine tool according to claim 1, wherein
said torque comparison unit includes
an upper torque limit comparison unit configured to compare the disturbance torque with the upper limit, and
a lower torque limit comparison unit configured to compare the disturbance torque with the lower limit.

6. A machine tool, comprising:
a movable door;
a drive motor configured to drive the movable door;
a power transferring mechanism configured to transfer power of the drive motor to the movable door;
a disturbance torque estimation unit configured to estimate a disturbance torque applied to the drive motor when the movable door is stopped;
a torque comparison unit configured to compare the disturbance torque estimated by the disturbance torque estimation unit when the movable door is stopped to a predetermined upper limit; and
a machine stopping unit configured to stop operation of the machine tool when the torque comparison unit determines that the disturbance torque estimated when the movable door is stopped is larger than the upper limit.

7. The machine tool according to claim 6, wherein
the disturbance torque estimation unit is configured to estimate the disturbance torque applied to the drive motor when the movable door is closed.

* * * * *